(12) United States Patent
Fries

(10) Patent No.: US 6,367,701 B1
(45) Date of Patent: Apr. 9, 2002

(54) PORTABLE DATA TRANSMISSION DEVICE, AND FIXING ELEMENT

(75) Inventor: Manfred Fries, Hunderdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/233,279

(22) Filed: Jan. 19, 1999

Related U.S. Application Data

(63) Continuation of application No. PCT/DE97/01336, filed on Jun. 26, 1997.

(30) Foreign Application Priority Data

Jul. 18, 1996 (DE) .......................................... 196 29 086

(51) Int. Cl.[7] .............................................. G06K 7/00
(52) U.S. Cl. ........................ 235/486; 235/493; 235/492
(58) Field of Search ................................. 235/485, 492, 235/493, 472.02, 449, 380, 379

(56) References Cited

U.S. PATENT DOCUMENTS

| | | | | |
|---|---|---|---|---|
| 4,277,837 A | * | 7/1981 | Stuckert | 235/379 |
| 4,757,185 A | * | 7/1988 | Onishi | 235/380 |
| 4,795,898 A | * | 1/1989 | Bernstein et al. | 235/487 |
| 4,835,373 A |   | 5/1989 | Adams et al. | 235/487 |
| 5,477,215 A | * | 12/1995 | Mandelbaum | 235/380 |
| 5,736,729 A | * | 4/1998 | Seppanen | 235/492 |
| 5,791,474 A | * | 8/1998 | Hansen | 235/486 |

FOREIGN PATENT DOCUMENTS

| | | | |
|---|---|---|---|
| DE | 3611441 C2 | 8/1993 | |
| DE | 4310517 A1 | 10/1994 | |
| DE | 4401089 A1 | 7/1995 | |
| DE | 29513985 U1 | 12/1995 | |
| DE | 29607253 U1 | 8/1996 | |
| EP | 0691625 A1 | 1/1996 | |
| EP | 0860881 | * 8/1998 | ............. G06F/1/00 |

OTHER PUBLICATIONS

Published International Patent Application No. 95/14980 (Seppänen), dated Jun. 1, 1995.

* cited by examiner

Primary Examiner—Michael G. Lee
Assistant Examiner—Daniel St. Cyr
(74) Attorney, Agent, or Firm—Herbert L. Lerner; Laurence A. Greenberg; Werner H. Stemer

(57) ABSTRACT

The portable data transmission system is adapted to the contactless transmission of electrical signals and/or data between a smart card and a read-write station. The smart card has an electronic circuit with a data memory and an induction coil integrated in a smart card body. A coupling element is assigned to the induction coil and is disposed in a predetermined spatial position with regard to the induction coil. The smart card and the coupling element are respectively autonomous components which can be used independently of one another. A fixing element is at least partially matched to the outer dimensions of the smart card. The fixing element supports the smart card, on the one hand, and the coupling element, on the other hand, in the predetermined position with regard to the smart card.

18 Claims, 2 Drawing Sheets

PORTABLE DATA TRANSMISSION DEVICE, AND FIXING ELEMENT

CROSS-REFERENCE TO RELATED APPLICATION:

This is a continuation of copending International Application PCT/DE97/01336, filed Jun. 26, 1997, which designated the United States.

BACKGROUND OF THE INVENTION

Field of the Invention

The invention relates to a portable data transmission device for the transmission of electrical signals and/or data to a read-write station. The device has a data medium in which an electronic circuit with a data memory is integrated, and a coupling element, which is assigned to the electronic circuit and is arranged or supported in a predetermined spatial position relative to the electronic circuit. A fixing element is provided, which is at least partially matched to the outer dimensions of the data medium and which supports the data medium, on the one hand, and the coupling element, on the other hand, in the predetermined position with regard to the data medium.

The invention further pertains to a fixing element for supporting a coupling element a contactless smart card. The coupling element is thereby supported by the fixing element. An electronic circuit with a data memory and an induction coil that is electrically connected to the electronic circuit are integrated in the smart card.

The application possibilities of smart cards, which are designed, as a rule, in the check card format, have become extremely diverse on account of a high functional flexibility. They are continuing to increase with rising computer power and storage capacity of the available integrated circuits. In addition to the currently typical fields of application of such smart cards in the form of health insurance cards, flexitime recording cards, telephone cards and the like, in the future applications will emerge, in particular, in electronic payment transactions, in computer access control, in protected data stores and so on. With regard to the type of coupling to a terminal or a read-write station, a distinction is made between smart cards with contacts and so-called contactless smart cards. In the case of a smart card with contacts, contact is made by a metallic contact zone with contact areas which are standardized, usually according to an ISO standard. In addition, there are contactless smart cards which afford not only technical advantages over the smart card with contacts but also a range of interesting new application possibilities for the card issuer and the card co-user. Thus, contactless smart cards do not, for example, necessarily have to be inserted into a card reader, rather there are systems which function over a distance of a few meters. A broad area of application is that of local public transport, for example, where as many people as possible must be detected in the shortest possible time. In addition to other advantages, the contactless smart card affords the advantage that no technical elements are visible on the surface of the card, with the result that the visual configuration of the surface of the card is not limited by magnetic strips or contact areas.

The disadvantages of currently available contactless smart cards reside primarily in the additional components such as transmission coils or capacitor plates which have to be integrated in the card. Furthermore, the electronics required in the contactless smart card in order to contactlessly transmit electrical signals to the read-write station are relatively complex. Circuits which enable signal transmission by means of microwaves, optical signals, capacitive or inductive coupling are suitable, in principle, for this purpose, capacitive and inductive coupling being the most suitable owing to the flat design of the smart card. At the present time the transmission is effected inductively in most of the contactless cards, by which method both the data and the power transmission can be realized. Thus, one or more induction coils are integrated in the card body and make contact in a suitable manner with the circuit situated on the semiconductor chip. Electrical signals are transmitted according to the principle of the loosely coupled transformer, the carrier frequency lying, for example, in the range between 100 and 300 kHz or being a few MHz, in particular the industrial frequency of 13.56 MHz. This necessitates induction coils having coil areas of typically about 30 to 40 $cm^2$, which are significantly larger than the base area of the semiconductor chip of the order of magnitude of about 10 $mm^2$, the induction coil as a rule having only a few turns and being of planar design.

As a rule, the semiconductor components are mounted in the form of prefabricated modules or directly as a chip onto the etched coil. The chip module, which is present as a separate structural part, together with the induction coil is then laminated into the card body in order to complete the smart card, intermediate sheets in the form of inlay sheets being incorporated for volume equalization in the course of lamination, the intermediate sheets being provided with stamped-out portions, if appropriate. Limits are imposed on the conceivably possible arrangements and designs of the induction coil, firstly by the predetermined maximum structural height of about 840 $\mu$m of an ISO smart card and secondly on account of the predetermined bending properties according to the ISO standard, and so limits are imposed on the maximum magnetic flux density that can be achieved. An important parameter in contactless smart cards is the range, that is to say the maximum distance between smart card and read-write station within which the data transmission still functions entirely satisfactorily. Apart from the properties of the read-write station, the maximum possible range primarily depends on the matching of the induction coil within the smart card in relation to the semiconductor chip, and on the effective area of the induction coil, which operates as an antenna, the coil area naturally being limited on account of the predetermined size of the smart card.

European published patent application EP 0 691 625 describes a portable radio-frequency encapsulation of a smart card as described above. That encapsulation incorporates in it a battery-powered microcontroller circuit, which is used to enable the contactless transmission of data from the smart card to a reading unit. The data exchange from the smart card to the microcontroller circuit provided in the encapsulation is effected capacitively via capacitor plates. Voltage is supplied to the smart card by means of an inductive driver circuit which is provided in the encapsulation and also has a ferrite core.

German published patent application DE 44 01 089 describes a protective enclosure for contactless smart cards, in which the smart card is surrounded by a planar, in particular rectangular, enclosure. At least a partial region of the areas surrounding the card is electrically conductive. The protective enclosure enables contactless smart cards to be protected against unauthorized access.

SUMMARY OF THE INVENTION

It is accordingly an object of the invention to provide a portable data transfer device for a smart card and an associated fixing element, which overcomes the above-mentioned disadvantages of the heretofore-known devices and methods of this general type and which improves the reading or writing security when the contactless smart card is guided past the read-write station and the maximum possible reading or writing distance can be increased.

With the foregoing and other objects in view there is provided, in accordance with the invention, a portable data transmission system for transmitting signals to a read-write station, comprising:

a contactless smart card with a card body having given outer dimensions and carrying an electronic circuit with a data memory and an induction coil integrated in the card body and electrically connected to the electronic circuit;

a fixing element having dimensions substantially matched to the given outer dimensions of the card body and being adapted to receive the smart card; and a coupling element supported at the fixing element and having a defined spatial position relative to the electronic circuit when the smart card is received by the fixing element, the coupling element having magnetic material associated with the induction coil for facilitating a signal transmission between the contactless smart card and a read-write station and increasing a maximum signal transmission distance.

In other words, the invention provides for the data medium to constitute a contactless smart card having an induction coil which is integrated in the card body of the smart card and is electrically connected to the electronic circuit, and for the coupling element to have a magnetic material assigned to the induction coil. The magnetic material may constitute a ferrite material, incorporated in the fixing element, as a solid body, it being possible to use not only the traditional ferrite materials but also other suitable magnetic materials, for example magnetic materials from the rare earth elements, such as, for example, barium titanate and the like. In the event of using such ferrites in order to increase the magnetic flux density of the induction coil accommodated in the smart card, according to the inventive principle one is not bound to the ISO specifications with regard to the bending properties, said specifications always having to be fulfilled in the case of the actual smart card; by contrast, given the introduction of ferrite materials directly into the card, as a general rule the requisite ISO bending test specifications cannot be achieved.

The invention enables a series of advantages over previously known contactless smart cards. On the one hand, a coupling element which amplifies the antenna action during the contactless transmission of the electrical signals to the read-write station can be optimized, independently of the structural specifications of the smart card, with regard to the maximum possible reading or writing distance. Thus, the structural height of the coupling element may amount, for example, up to a number of millimeters, which opens up the use of ferrite material as coupling element, as a result of which, for example in the case of contactless access control of a user, the reading security can be improved and the maximum reading distance distinctly increased. On the other hand, the fixing element with the coupling element can be used as often as desired and, for example, can be reused after the smart card has been discarded.

In accordance with an added feature of the invention, the fixing element is an encapsulation pocket for the smart card for at least partially accommodating the smart card. In this case, the encapsulation may serve in any event as protection for the contactless smart card, and also as a medium carrying decoration and advertising. Furthermore, the encapsulation may, however, also be produced from a transparent or at least partially translucent material, in particular plastic material, and in this way, with the smart card introduced into the encapsulation, ensure optical visibility of the inscriptions applied on the smart card.

In accordance with an additional feature of the invention, the coupling element is permanently fixed to the fixing element, and wherein the fixing element and the smart card are adapted to mutually engage in a releasable mechanical connection. In this way, when the smart card is accommodated or fixed in or on the fixing element, correct positioning of the coupling element with regard to the electronic circuit is ensured. It is nevertheless ensured that the connection or release of data medium and coupling element can be handled in as simple a manner as possible.

In accordance with another feature of the invention, the fixing element is produced from plastic material. It is thereby expeditious to form the coupling element of magnetic particles incorporated in the plastic material of the fixing element. In such a case, the fixing element can also achieve the standard specifications envisaged for smart cards with regard to the bending properties.

In accordance with a further feature of the invention, the fixing element is formed as a pocket for at least partially accommodating the smart card, the pocket being formed with a baseplate, a cover plate at least partially covering the baseplate, and a spacer supporting the cover plate at an edge region of the baseplate.

In accordance with again an added feature of the invention, the spacer is a substantially U-shaped spacer. In a further embodiment, the spacer is formed of a plurality of mutually spaced apart individual spacer webs distributed about the edge region of the baseplate.

In accordance with again an additional feature of the invention, the coupling element is incorporated in the baseplate or the cover plate, or in both.

With the above and other features in view there is also provided, in accordance with the invention, a combination of a coupling element and a fixing element for mechanically fixing a contactless smart card having an electronic circuit and an induction coil connected to the electronic circuit relative to the coupling element, for signal transmission between the smart card and the coupling element:

the fixing element comprising a baseplate with an edge region, a cover plate at least partially covering the baseplate, and a spacer supporting the cover plate on the edge region of the baseplate, the baseplate, the cover plate, and the spacer together forming a pocket for receiving the smart card;

the coupling element having a magnetic material associated with the induction coil of the smart card; and the coupling element being incorporated in at least one of the baseplate and the cover plate, in a predetermined spatial position relative to the contactless smart card when the smart card is inserted in the pocket.

It is a particularly preferred embodiment of the invention, to form the fixing element as a pocket that at least partially accommodates the smart card. The pocket has a baseplate and a cover plate, which at least partially covers the baseplate and is supported on the edge region of the baseplate by means of a spacer. The spacer may be designed as an essentially U-shaped spacer and/or in the form of individual spacer webs which are distributed on the edge region of the baseplate and are spaced apart from one another. In this embodiment, the coupling element may either be incorporated on one side within only a side wall at a predetermined position parallel to the smart card, or, for a more extensive enhancement of the effective antenna action, may be incorporated on both sides opposite the smart card within the fixing element.

Other features which are considered as characteristic for the invention are set forth in the appended claims.

Although the invention is illustrated and described herein as embodied in a portable data transmission device, and fixing element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
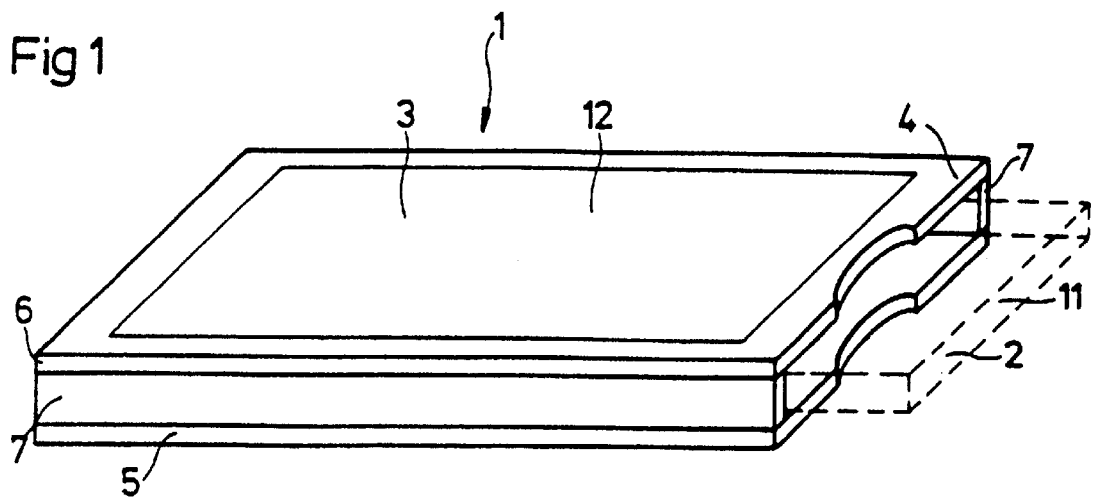
FIG. 1 is a perspective view of a portable data transmission device with a data medium (contactless smart card) and a fixing element supporting the coupling element, in accordance with an exemplary embodiment of the invention.
Figure 2:
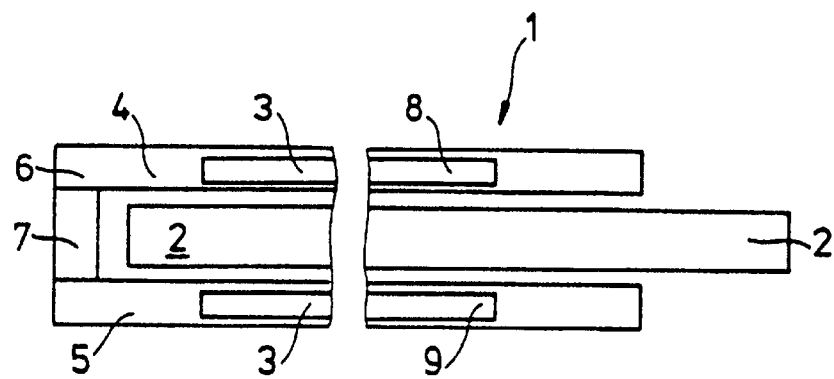
FIG. 2 is a diagrammatic sectional view of a further exemplary embodiment of the novel data transmission device.
Figure 3:
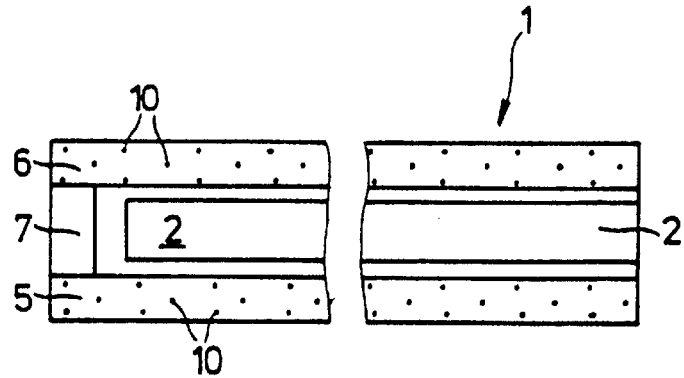
FIG. 3 is a diagrammatic sectional view of a further exemplary embodiment of the novel data transmission device.

Referring now to the figures of the drawing in detail, the exemplary embodiments of the invention which are illustrated in FIGS. 1 to 3 comprise a portable data transmission device 1 for the contactless transmission of electrical signals and/or data to a non-illustrated, stationary read-write station. The transmission device has a data medium 2 in the form of a commercially available contactless smart card (chip card) and a coupling element 3 made of a magnetic material. The contactless smart card 2 comprises a card body 11 made of plastic material in the check card format. An electronic circuit with a data memory are integrated in the card body 11. The circuit is formed on a semiconductor chip. An induction coil, which is electrically connected to the circuit, is also integrated in the card body 11. The turns of the induction coil have extents which correspond approximately to the outer dimensions of the card body 11. This results in the utilization of the maximum card area of the smart card 2. The production of such a contactless smart card 2 with integrated induction coil and semiconductor chip is familiar to those of skill in the art and need not be explained in any detail here.

According to the invention, a fixing element 4 is provided, which is at least partially matched to the outer dimensions of the data medium 2 and supports the data medium 2, on the one hand, and the coupling element 3, on the other hand, in the predetermined position with regard to the data medium 2. The coupling element 3 is permanently fixed on or incorporated in the fixing element 4. In the preferred exemplary embodiments according to FIGS. 1 to 3, the fixing element 4 constitutes a protective enclosure for the contactless smart card in the form of a pocket for near complete (FIGS. 1 and 2) or complete accommodation (FIG. 3) of the data medium 2. The pocket has a baseplate 5 and a cover plate or cover sheet 6, which at least partially covers the baseplate 5 and is supported on the edge region of the baseplate 5 by means of a supporting spacer 7, the spacer 7 is an essentially U-shaped spacer. The U-shaped spacer 7 is, for example, bonded onto the edge region of the baseplate 5, and the cover sheet 6 bonded onto the spacer is supported in such a way that the cover sheet 6 is arranged at a specific distance from the baseplate 5. The fixing element 4 illustrated in FIGS. 1 to 3 thus forms a pocket that is closed off on three sides by means of the spacer 7, and is open only on one side. The baseplate 5, which is optically transparent, if appropriate, and the cover plate 6 are each composed of a flexible, mechanically hard-wearing and dimensionally stable plastic, such as polycarbonate or polyester, for example. The total thickness of the cover plate 6, which also comprises a plurality of individual sheets, is 0.25 mm to 2 mm, for example. The thickness of the spacer 7 is chosen such that easy insertion of the data medium 2 into the fixing element 4 is ensured, in other words, for example, slightly more than 840 $\mu$m.

In a further embodiment of the invention, which is not specifically illustrated, the support may be formed, instead of the U-shaped spacer 7, with individual spacer webs which are distributed on the edge region of the baseplate 5. In that case the fixing element 4 is not completely closed off at the three edge regions but rather has an air gap between the cover plate 6 and the baseplate 5, with the result that the data medium 2 can be inserted even more easily into the fixing element 4. In a further exemplary embodiment (likewise not specifically illustrated) of a fixing element according to the invention, the baseplate is composed of the same material as the cover plate. A fixing element of this type may be designed, for example, in a simple manner such that a single cover plate having twice the area of a smart card is folded in the middle and bonded together for example at three edge sides by means of the U-shaped spacer, which has adhesive surfaces. In a further embodiment, for the sake of easier production, a portion of the cover plate which is supported at the edge region of the baseplate is designed as the spacer, with the result that cover plate and spacer consist of one piece. In this case, that edge section of the cover plate which forms the spacer may be theretofore, embossed, folded and bent, or be produced by another method.

In the exemplary embodiment illustrated in FIG. 1, a thin, plate-type ferrite 12 is incorporated within the cover plate 6. The base area of which ferrite corresponds almost completely to the corresponding outer dimensions of the data medium 2. Here, the cover plate 6 comprises two equal-area plastic sheets between which the ferrite plate 12 is inserted and which are welded together at the edge region.

In the exemplary embodiment illustrated in FIG. 2, ferrite bodies 8 and 9 are incorporated both in the cover plate 6 and in the baseplate 5. The bodies 8 and 9 each have a thickness of, say, about 0.5 mm to 1 mm.

In the exemplary embodiment illustrated in FIG. 3, magnetic particles 10 are bound in each case in the baseplate 5 and cover plate 6. The plates 5 and 6 are plastic sheets with a thickness of about 1 to 2 mm.

Figure 4:
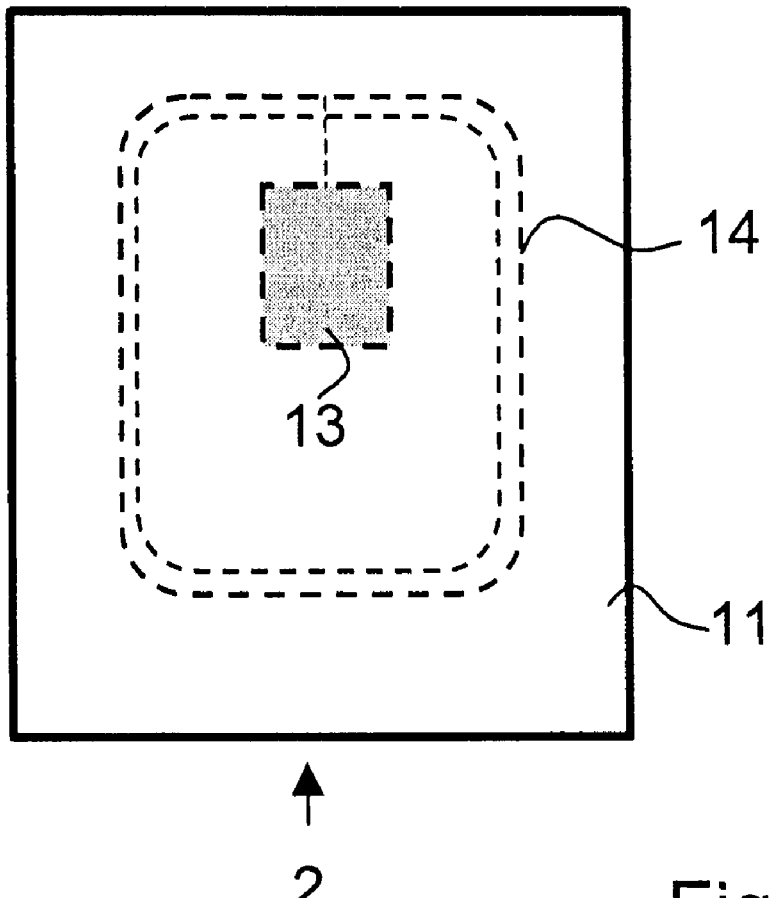
FIG. 4 is a schematic plan view of a smart card.

With reference to FIG. 4, it will be understood that the illustration of the card 2 is merely schematic. The card body 11 is made of plastic and it houses an electronic circuit in a chip 13 with a memory and an induction coil 14 is electrically connected to the chip 13.

I claim:

1. A portable data transmission system, comprising:
   a contactless smart card with a card body having given outer dimensions and carrying an electronic circuit with a data memory and an induction coil integrated in said card body and electrically connected to said electronic circuit;
   a fixing element having dimensions substantially matched to the given outer dimensions of said card body and being adapted to receive said smart card; and
   magnetic particles incorporated in said fixing element and having a defined spatial position relative to said induction coil in said card body for facilitating contactless inductive transmission of data and power when said smart card is received by said fixing element.

2. The data transmission system according to claim 1, wherein said fixing element is an encapsulation pocket for said smart card for at least partially accommodating said smart card.

3. The data transmission system according to claim 1, wherein said magnetic particles are permanently fixed to said fixing element, and wherein said fixing element and said smart card are adapted to mutually engage in a releasable mechanical connection.

4. The data transmission system according to claim 1, wherein said fixing element is produced from plastic material.

5. The data transmission system according to claim 4, wherein said magnetic particles are incorporated in said plastic material of said fixing element.

6. The data transmission system according to claim 1, wherein said fixing element is formed as a pocket for at least partially accommodating said smart card, said pocket being formed with a baseplate, a cover plate at least partially covering said baseplate, and a spacer supporting said cover plate at an edge region of said baseplate.

7. The data transmission system according to claim 6, wherein said spacer is a substantially U-shaped spacer.

8. The data transmission system according to claim 6, wherein said spacer is formed of a plurality of mutually spaced apart individual spacer webs distributed about the edge region of said baseplate.

9. The data transmission system according to claim 6, wherein said magnetic particles are incorporated in one of said baseplate and said cover plate.

10. The data transmission system according to claim 6, wherein said magnetic particles are incorporated in said baseplate and said cover plate.

11. A combination of magnetic particles and a fixing element for mechanically fixing a contactless smart card having an electronic circuit and an induction coil connected to the electronic circuit relative to magnetic particles, for inductive transmission of data and power between the smart card and a read-write station associated with said fixing element:
    said fixing element comprising a baseplate with an edge region, a cover plate at least partially covering said baseplate, and a spacer supporting said cover plate on said edge region of said baseplate, said baseplate, said cover plate, and said spacer together forming a pocket for receiving the smart card; and
    said magnetic particles being incorporated in at least one of said baseplate and said cover plate, in a predetermined spatial position relative to the induction coil of the contactless smart card for facilitating contactless inductive transmission of data and power between the contactless smart card and a read-write station when the contactless smart card is inserted in said pocket.

12. The fixing element according to claim 11, wherein said spacer is a substantially U-shaped spacer.

13. The fixing element according to claim 12, wherein said baseplate, said cover plate, and said spacer are produced from plastic material.

14. The fixing element according to claim 13, wherein said magnetic particles are incorporated in said plastic material.

15. The fixing element according to claim 11, wherein said spacer is formed of a plurality of mutually spaced apart individual spacer webs distributed about said edge region of said baseplate.

16. The fixing element according to claim 11, wherein said baseplate, said cover plate, and said spacer together form an encapsulation pocket for at least partially accommodating the smart card.

17. The fixing element according to claim 11, wherein said magnetic particles are permanently fixed to the fixing element, and wherein the fixing element and said smart card are adapted to mutually engage in a releasable mechanical connection.

18. A portable data transmission system for inductively transmitting and receiving transmission of data and power from a read-write station to a contactless a smart card, comprising:
    a contactless smart card with a card body having given outer dimensions and carrying an electronic circuit with a data memory and an induction coil integrated in said card body and electrically connected to said electronic circuit;
    a fixing element having dimensions substantially matched to the given outer dimensions of said card body and being adapted for receiving said smart card, said fixing element being connected to or part of a read-write station; and
    magnetic particles incorporated in said fixing element and having a defined spatial position relative to said induction coil in said card body when said smart card is received by said fixing element such as facilitating contactless inductive transmission of data and power between said contactless smart card and said read-write station.

* * * * *